Oct. 23, 1945.  F. M. YOUNG ET AL  2,387,485
HEAT EXCHANGE UNIT FOR RADIAL TYPE ENGINES
Filed Aug. 28, 1943  3 Sheets-Sheet 1
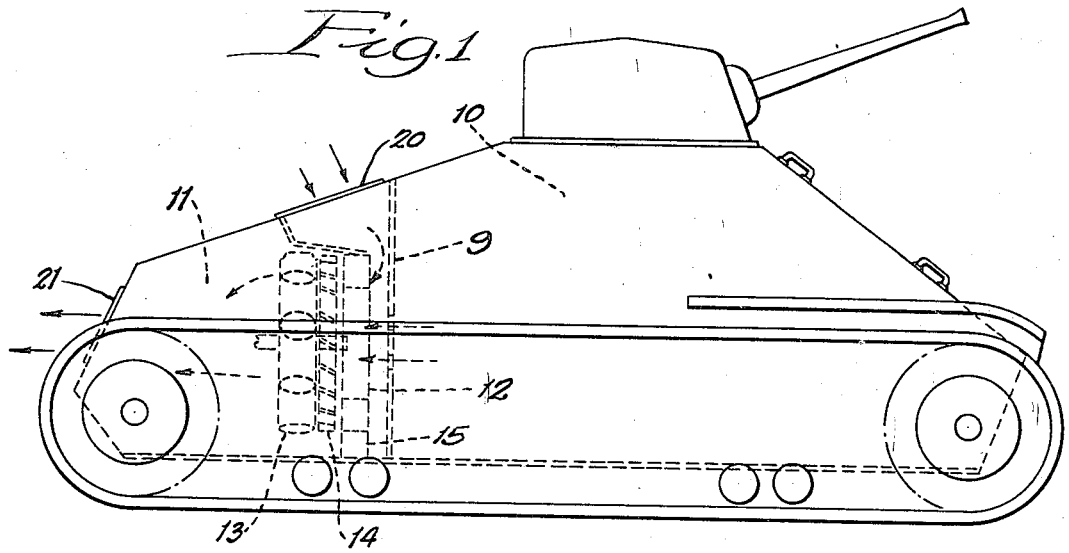
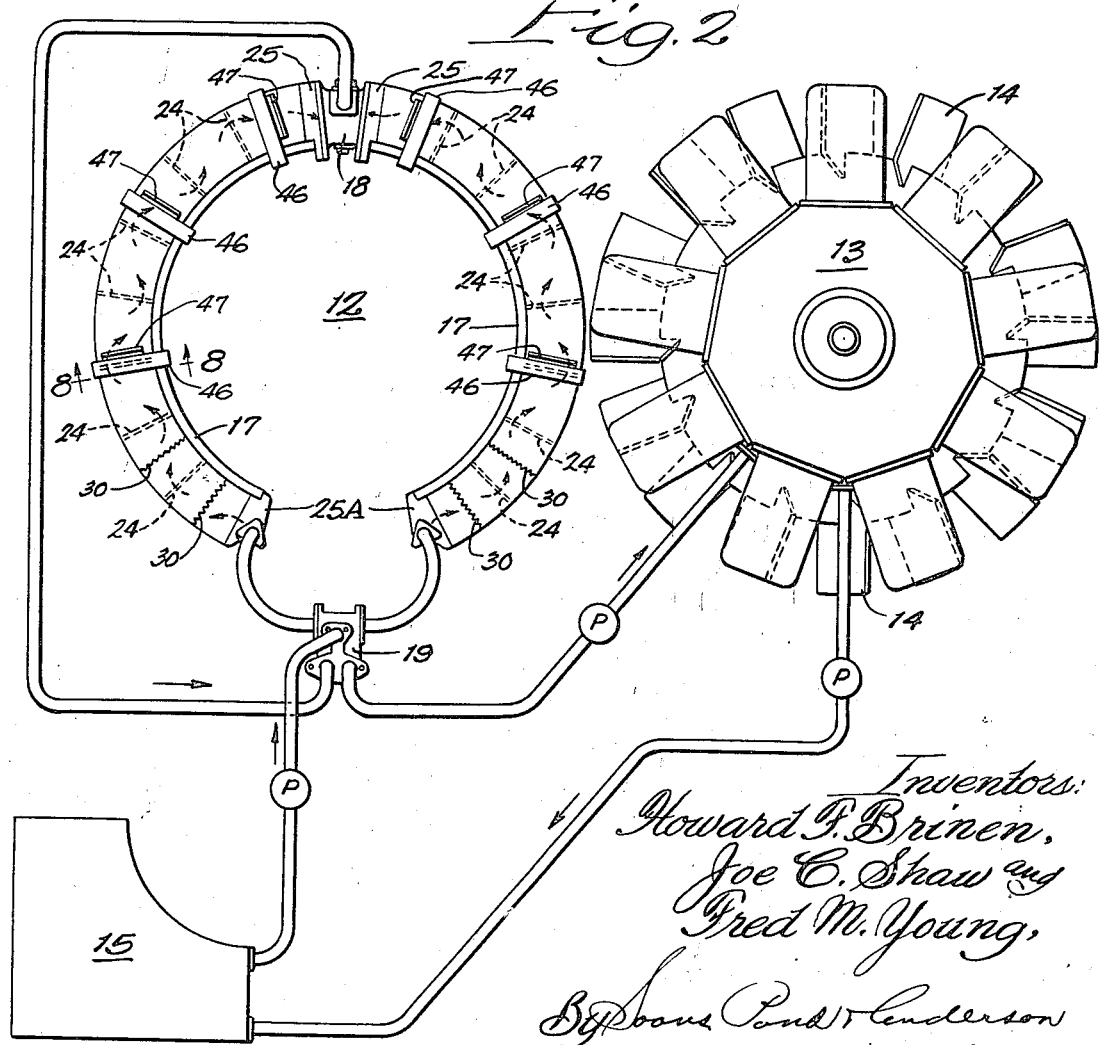

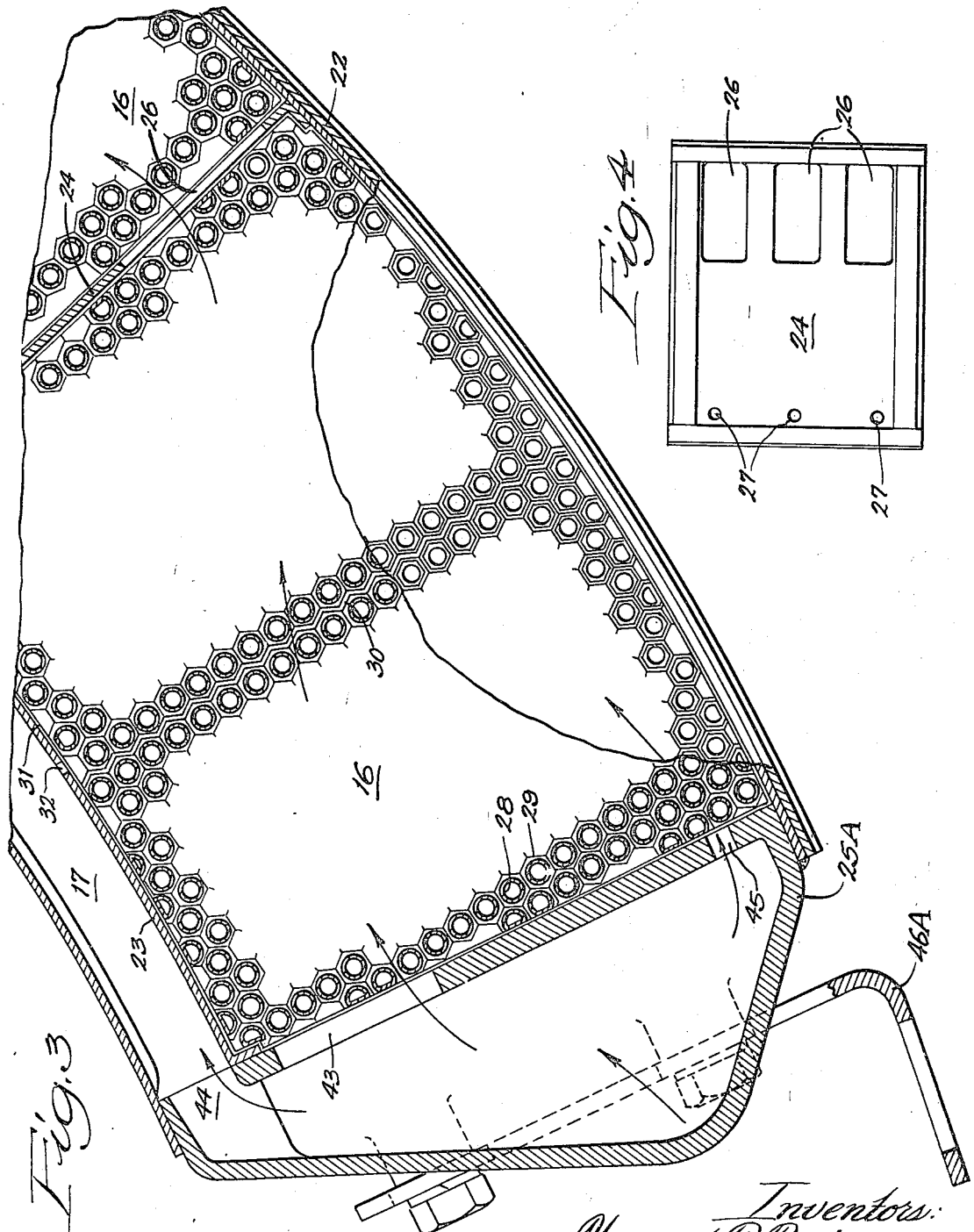

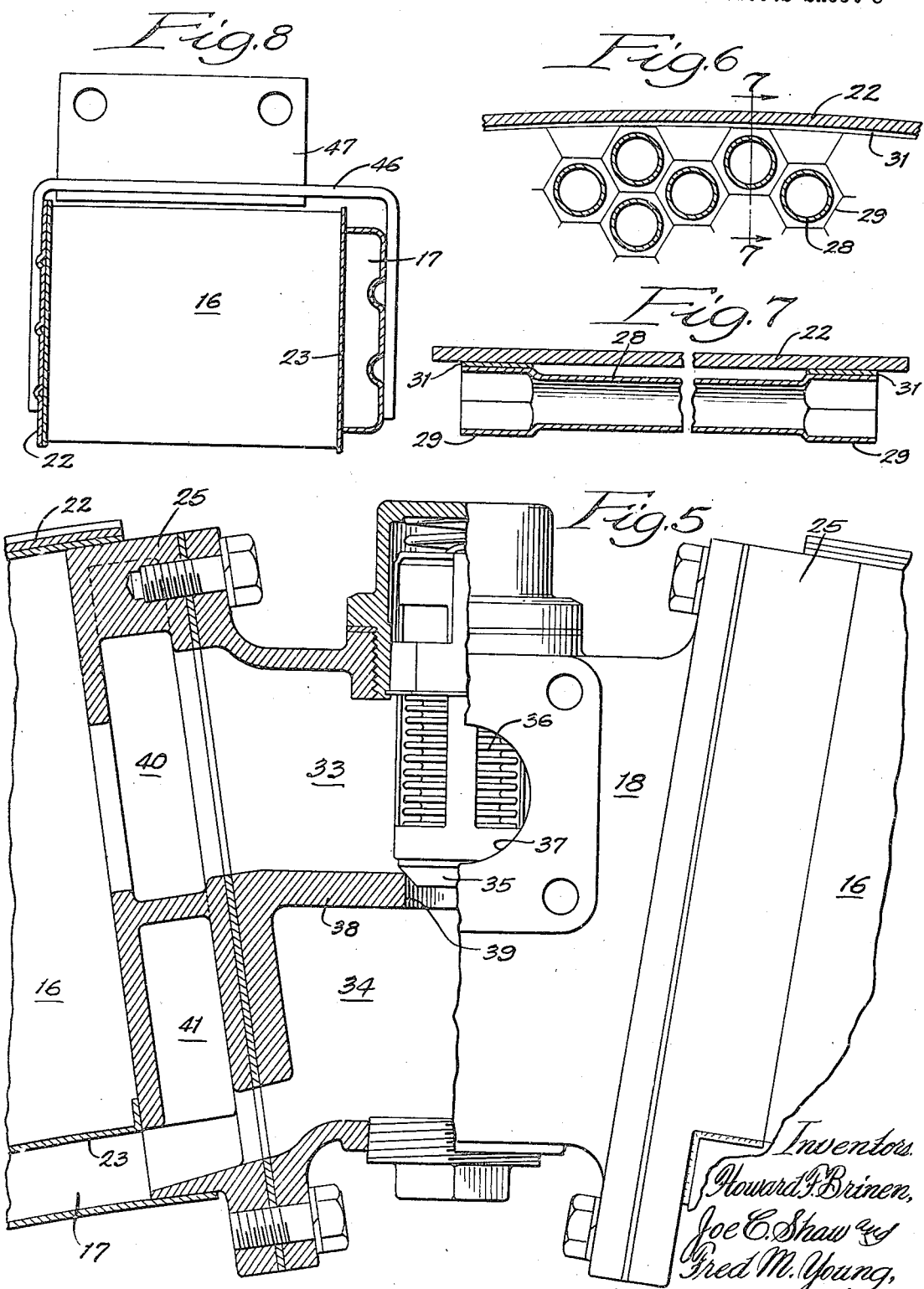

Patented Oct. 23, 1945

2,387,485

UNITED STATES PATENT OFFICE 2,387,485

HEAT EXCHANGE UNIT FOR RADIAL TYPE ENGINES

Fred M. Young, Joe C. Shaw, and Howard F. Brinen, Racine, Wis., assignors to Young Radiator Company, a corporation of Wisconsin Application August 28, 1943, Serial No. 500,330

1 Claim. (Cl. 257—2)

This invention relates to heat exchange units especially adapted for use with the lubricating oil cooling system for radial, aircraft-type engines where employed as the power unit for tanks. More particularly the invention relates to a heat exchange unit designed for use with the oiling system for Diesel aircraft-type engine.

The modern tank must of necessity be a standardized construction. Moreover, it must be so arranged that the fullest possible utilization may be made of the space therein. Obviously, as much of that space as can be made available is required for the crew. That means that the space for a power-propelling unit must be restricted to the most practical limits consistent with securing the required amount of power to make the operation of the tank most effective. At the present time, the Diesel radial engine best meets this power requirement. It is much superior and more economical than the gasoline type of radial aircraft engine. However, the heat dispersion for the lubricating system of a Diesel engine is many times greater than the heat dispersion of a gasoline engine of the same type and power. Accordingly, the cooling system for the lubricating oil generally provided for the gasoline engine is not suitable for use with the Diesel engine.

The main objects of this invention, therefore, are to provide an improved construction for a heat exchange unit for use with the oiling system for radial aircraft-type engines as applied to tanks; to provide an improved construction of a heat exchange unit as will effect the heat dispersion required for a Diesel radial aircraft-type engine when applied to tanks of standardized construction; to provide an improved heat exchange unit for this purpose which can be associated with the engine and an air circulating unit in such compact relationship that the association of the parts may be accommodated within the space heretofore allotted for the tank power unit; to provide a heat exchange unit of this type having an improved arrangement of the warm-up chamber in connection with the main cooling core so as to permit the use of the maximum number of air-flow tubes within a given space; and to provide an improved heat exchange unit of this type the economic and facile manufacture of which is made possible by the assembly of a plurality of identically-formed, standardized sub-cooling units within a standardized supporting frame.

In the embodiment of the invention shown in the accompanying drawings:

Fig. 1 is a simplified outline elevation of a tank showing the interior division thereof into crew and power compartments, and indicating the position of the power unit in the latter compartment;

Fig. 2 is a diagrammatic view indicating the general form of this improved type of heat exchange unit and its relationship to a radial aircraft-type engine;

Fig. 3 is an enlarged fragmentary view, partly in section and partly in elevation, of the inlet end of one of the arcuate sections which make up this improved heat exchange unit;

Fig. 4 is a face view of one of the baffle plates which separates the several tubular core units of which the completed heat exchange unit is comprised;

Fig. 5 is likewise an enlarged view, partly sectional and partly elevational, of the valve-equipped coupling which connects the outlet ends of the two arcuate sections which form this improved type of heat exchange unit;

Figs. 6 and 7 are enlarged, fragmentary, cross-sectional views (Fig. 7 being taken on the line 7—7 of Fig. 6) showing how a perimetric band on the tubular units not only reinforces the bonding of tubes but also serves to space the perimetric tubes away from the supporting housing a bit more than would be the case if such a perimetric band were not used; and Fig. 8 is a cross-sectional view taken on the line 8—8 of Fig. 2 showing one of the supporting brackets and related flange by which the unit is secured to its supporting frame.

The outline view of the tank (Fig. 1) indicates that a bulkhead 9 divides the interior of the tank into a crew compartment 10 and a power compartment 11. As previously emphasized, it is imperative that the bulkhead 9 be so positioned as to provide the fullest possible amount of space for the crew compartment 10. Obviously, this means the restricting of the power unit compartment to the very minimum consistent with the requirements for a suitable power unit.

For economic manufacture these tanks must be of a standardized construction. Heretofore, this construction has been designed with a view to providing a power compartment 11 such as would accomodate a radial aircraft-type engine using gasoline for its fuel. More recent developments have sought to make these tanks more effective and economical in operation by the use of Diesel-type radial aircraft engines. Naturally, it has been required to confine the Diesel engine and all of its related parts within the power compartment 11 previously arranged for the gasoline type of engine. However, the Diesel engine requires a heat dispersion some seven or eight times greater than the heat dispersion required for the gasoline engine. Accordingly, it has been imperative to devise a cooling system for the lubricating oil required for a Diesel engine which would successfully effect this excessive heat dispersion and at the same time permit the association of the heat exchange unit with the Diesel engine within the tank space allotted for the power unit.

This end has been accomplished by the new and novel structure shown in the drawings. In the embodiment illustrated the cooling unit 12 is in the form of an annulus constructed for coaxial mounting with the engine 13 forward of the engine-cooling fan 14 and for suitable connection to an oil supply tank 15.

The cooling unit as herein shown comprises two arcuate-shaped sections, each of which includes a supporting frame or housing wherein are associated a number of individual tube units 16. A warming chamber or muff 17 is formed on the inner periphery of each of these sections and the two ends of these arcuate sections are connected together by a valve-controlled coupling 18, and related to a piping system through which the flow of oil under the action of the several pumps P is controlled by a thermostatically-operated valve mechanism 19. In its assembled form the cooling unit is attached to a frame supported on the engine 13, forwardly of the fan 14, as shown in dotted outline in Fig. 1.

With the cooling unit thus positioned, the fan 14 draws outside air through the grille 20 and through the tubes of the cooling unit, forces it across the finned portions of the engine and discharges it through a grille 21 in the rear of the tank casing. Incidentally, the bulkhead 9 is provided with suitable openings through which a small amount of air may be drawn from the crew compartment 10 sufficient to keep that compartment free from gases or excessive heat.

The frame or housing for each of the arcuate sections of the cooling unit comprises a pair of concentrically arranged plates 22 and 23 held together in the spaced relationship by the silver-soldered baffle plates 24, thereby forming several compartments for the tubular cooling units 16. The upper and lower ends of these concentrically arranged plates are closed by chambered castings 25 and 25A respectively.

The baffle plates are formed with main openings 26 and orifices 27. The main openings provide for communication between the cores of adjacent tube units 16. The plates are so positioned that the openings 26 in adjacent plates are located at the opposite peripheries of the housing and thus require the oil to follow a circuitous path as it travels the length of each of the arcuate sections, as has been indicated by the arrows in Figs. 2 and 3. The small orifices 27 allow for a direct seepage from the core of one tubular unit 16 to the other at the ends of the baffle plate opposite where occurs the main flow of oil from one core section to the other.

The individual cooling units 16 are each made up of a bundle of tubes, the ends of which are expanded into hexagonal heads 29. These heads contact each other so as to hold the cylindrical portion of the tubes 28 in spaced relationship whereby, when the hexagonal heads 29 are bonded together, the space around these tubes becomes a sealed core for the circulation of oil. Each unit 16 is made up individually but on a standard pattern so that any unit will fit within any one of the divisions between adjacent baffle plates 24, and between the end baffle plates 24 and the end castings 25 and 25A.

As is most clearly shown in Fig. 3, the units 16 embody a feature disclosed in copending application of Shaw and Schlapman, Ser. No. 508,104, filed October 29, 1943. This provides for adjacent radial rows of said tubes intermediate the ends of the unit 16 being spaced apart slightly more than are the rows of tubes throughout the remainder of the unit. This is accomplished by placing a narrow corrugated strip 30 between the hexagonal heads of the respective rows of tubes. Opposite these enlarged spaces in the core the plate 23 has orifices providing communication with the warm-up chamber or muff 17. Such a radial enlargement of the oil core communicating with the warm-up chamber helps to facilitate the flow of oil through the cooling unit, when the use of the cooling system is initiated in low temperatures, as will hereinafter more fully appear.

A narrow band 31 is formed around the opposite perimeters of each of the tubular units 16, as shown in Figs. 6 and 7. Not only do these bands provide reinforcing bonds around the unit, but they also serve to space the perimetric rows of tubes slightly further away from the housing than would be the case otherwise. This also helps to facilitate the flow of oil through the cooling system when it is first put into use in low temperatures.

The warm-up chamber or muff 17 is formed by securing a U-shaped channel member to the inner periphery of the plate 23 and having its ends secured to the end castings 25 and 25A.

As most clearly shown in Fig. 5, the coupling 18 unites the two arcuate sections through its connection to the castings 25 by means of suitable cap screws. This coupling 18 is formed with a pair of chambers 33 and 34 communication between which is controlled by a valve 35, actuated by a thermostat 36, for the purpose of directing the flow of oil from the two sections of the heat exchange unit through the common outlet 37.

The chambers 33 and 34 are formed by a partition 38 having a valve-seat opening 39 connecting said chambers. The chamber 33 connects with the outlet 37 and a passage 40 in each of the castings 25 which in turn communicate with the cores of adjacent tubular units 16. The chamber 34 connects with a passage 41 in each of the castings 25 which in turn communicate with the adjacent ends of the warm-up chamber or muff 17.

The thermostat 36 may be of any type sufficiently sensitive to the temperature of the oil in the chamber 33 to shift the valve 35 into and out of coactive relationship with the valve-seat opening 39. As herein shown, the thermostat is of a bellows type which employs a highly volatile liquid as the motive agent. However, a thermostat using as its motive agent a wax composition with a high coefficient of expansion would be equally suitable.

The castings 25A have suitable inlets 42 (Fig. 2) and have outlets 43 (Fig. 3) communicating with the interior which in turn communicate with the oil core of the adjacent tubular units 16 and outlets 44 communicating with the warm-up chamber or muff 17. Orifices 45 provide a small supplemental communication between the interior of the castings 25A and the core of the adjacent tubular unit 16.

This heat exchange unit 12 is mounted on a frame supported on the engine 13 co-axially therewith. The attachment is made by means of flanged U-shaped brackets 46 (Fig. 8) which are secured to the outer face of the plate 22 and the muff 17. A flange 47 on each of these brackets is suitably apertured for receiving bolts whereby to secure the unit in place on the supporting frame. A special form of the bracket 46A is provided for the end castings 25A.

The valve mechanism 19 is a surge-valve type similar to that shown in copending application of Joe C. Shaw, Ser. No. 510,869 filed November 19, 1943. It is formed and equipped with a thermostatically-controlled valve so that when the temperature of the oil is below a critical point it would by-pass the heat exchange unit 12 altogether being directed from pipe leading from the supply tank 15 to the engine 13. When the temperature of the oil rose above this critical temperature, the valve mechanism 19 would be shifted by the thermostat to permit the oil to flow through the pipes connected with the inlets 43 of the two arcuate sections of the heat exchange unit 12.

The operation of the heat exchange unit herein shown, when connected with a Diesel engine in a tank, is as follows:

The flow of oil through the heat exchange unit is effected by means of the pumps P arranged in a system of pipes connecting the engine 13 and oil supply tank 15 with the heat exchange unit 12. During normal operation, the oil passing through the core of the two arcuate sections is exposed to heat exchange contact with the air drawn through the tubes and the temperature of the oil effected accordingly.

If under certain weather conditions the tank has been standing idle, the temperature of the oil in the system may be so cold and its viscosity consequently so high as to preclude the advisability of attempting to move the oil through the heat exchange unit 12. In such case the valve mechanism 19 would function to cause the oil to by-pass the unit 12, simply moving through the pipe system between the supply tank 15 and engine 13. Under less severe weather conditions the oil may be sufficiently viscous to pass through the warm-up chamber or muff 17 but not through the main core of the arcuate sections. Under such conditions the valve mechanism will be actuated to permit the delivery of oil to the heat exchange unit inlets 34. However, the thermostat 36 will have acted to retract the valve 35 to open communication between the chambers 33 and 34 and with the common outlet 37. This will permit the oil to flow from the warm-up chamber or muff 17 through the passages 41 of the castings 25 into the chamber 34, through the chamber 33, and out through the common outlet 37.

The oil being circulated through the piping system between the engine and the oil supply tank tends to rise in temperature. This warmer oil passing along the warm-up chamber or muff 17 communicates heat to oil in the contiguous area of the core of the tubular units 16. Moreover, the oil begins to trickle in through the orifices 32 into the communicating enlarged core areas in units 16. Also some of this warming oil will attempt to enter the core of the units 16 next adjacent to the castings 25A.

This warmer oil trickling into the units 16 will gradually reduce the viscosity of the oil in the cores and thereby further increase the temperature of the oil preparatory to securing a normal flow through the arcuate sections.

As the temperature of the oil passing through the chamber 33 begins to rise, the thermostat 36 will act to move the valve 35 to gradually cut off the flow of oil through the opening 39 between the compartments 33 and 34. As soon as this temperature rise is sufficient to cause the thermostat 36 to completely close the opening 39, a back pressure through the warm-up chamber or muff 17 will be established. Thereupon the pressure of the pumps P will require the oil to flow through the core of the arcuate sections of the heat exchange unit, following the circuitous path indicated by the arrows in Fig. 2 and passing out through the outlet 37.

Variations and modifications in the details of structure and arrangement of the parts may be resorted to within the spirit and coverage of the appended claim:

We claim:

An annulus-type heat exchange unit comprising, two arcuate-shaped sections each formed of a pair of concentrically-arranged plates held together in spaced relationship by radially-disposed baffles, bundles of closely-spaced, axially-disposed tubes inserted between said plates and said baffles and at their ends suitably bonded together and to said plates and baffles to form a sealed core surrounding said tubes extending the full circumferential length of said sections, said baffles having openings formed therein permitting communication between the cores of adjacent tube bundles, the openings in successive baffles being placed adjacent opposite plates whereby the flow of the coolant through said arcuate sections is radially crosswise as well as circumferential, a U-shaped member secured to the outer face of one of the said concentric plates of each of said sections and constituting an auxiliary chamber axially and circumferentially coextensive with the sealed core part thereof, cap members interfitting with said plates and U-shaped members to close the opposite ends of each of the cores and auxiliary chambers formed thereby, each of said cap members having separate ports communicating respectively with the adjacent ends of said core and auxiliary chamber, a two-chamber coupling connecting two contiguous cap members with said chambers communicating respectively with the separate ports in said caps, a valve seat in the partition separating said coupling chambers, a thermostatically-actuated valve mechanism adapted to coact with said valve seat to control communication between said chambers so as to determine the path of the coolant through said core and auxiliary chamber, and coolant inlet means connected to the cap members at the opposite ends of said arcuate-shaped sections.

FRED M. YOUNG.
JOE C. SHAW.
HOWARD F. BRINEN.